US012705650B2

(12) United States Patent
Ruan et al.

(10) Patent No.: US 12,705,650 B2
(45) Date of Patent: Aug. 11, 2026

(54) GENERATING AN INTERFACE DISPLAYING ITEMS OFFERED BY A WAREHOUSE THAT ACCOUNTS FOR PREDICTED AVAILABILITIES OF ITEMS DETERMINED FROM A TRAINED MODEL

(71) Applicant: Maplebear Inc., San Francisco, CA (US)

(72) Inventors: Chuanwei Ruan, Sunnyvale, CA (US); Diego Goyret, Los Gatos, CA (US); Tilman Drerup, Palo Alto, CA (US); Rob Donnelly, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 474 days.

(21) Appl. No.: 17/474,408

(22) Filed: Sep. 14, 2021

(65) Prior Publication Data

US 2023/0078450 A1 Mar. 16, 2023

(51) Int. Cl.

*G06Q 30/0601* (2023.01)
*G06F 3/0482* (2013.01)
*G06F 16/2457* (2019.01)
*G06F 16/9535* (2019.01)
*G06Q 10/087* (2023.01)

(Continued)

(52) U.S. Cl.

CPC ....... *G06Q 30/0603* (2013.01); *G06F 3/0482* (2013.01); *G06F 16/24578* (2019.01); *G06F 16/9535* (2019.01); *G06Q 30/0201* (2013.01); *G06Q 30/0202* (2013.01);

(Continued)

(58) Field of Classification Search

None

See application file for complete search history.

(56) References Cited

U.S. PATENT DOCUMENTS 10,963,659 B1 * 3/2021 Ahmed ................ G06K 7/1413
2004/0243588 A1 * 12/2004 Tanner ............... G06F 16/2471

(Continued)

FOREIGN PATENT DOCUMENTS

WO WO-2020118359 A1 * 6/2020 ............ G06Q 50/12

OTHER PUBLICATIONS

Pan, Shenle, et al. “Using Customer-Related Data to Enhance E-Grocery Home Delivery.” Industrial Management & Data Systems. vol. 117 No. 9, 2017, pp. 1917-1933. (Year: 2017).*

*Primary Examiner* — Susanna M. Diaz

(74) *Attorney, Agent, or Firm* — Fenwick & West LLP

(57) ABSTRACT

An online concierge system allows users to purchase items from warehouses and delivers the purchased items to the users. When displaying items offered by a warehouse, the online concierge system predicts an availability of the items at the warehouse using a trained model. When displaying items offered by the warehouse to a user, the online concierge system accounts for the predicted availabilities of different items. For example, the online concierge system determines scores for different items at the warehouse based on relevance to the user and adjusts a score for an item by its predicted availability. The online concierge system uses the adjusted scores for items when displaying items, demoting positions in an interface in which items with lower predicted availabilities are displayed. Additionally, the online concierge system may display a visual indication of a predicted availability of certain items, such as items with less than a threshold predicted availability.

21 Claims, 6 Drawing Sheets

(51) Int. Cl.
*G06Q 30/0201* (2023.01)
*G06Q 30/0202* (2023.01)

(52) U.S. Cl.
CPC ..... *G06Q 30/0625* (2013.01); *G06Q 30/0641* (2013.01); *G06Q 10/087* (2013.01)

(56) References Cited

U.S. PATENT DOCUMENTS

| | | | | |
|---|---|---|---|---|
| 2011/0035329 | A1* | 2/2011 | Delli Santi | H04L 67/535 705/347 |
| 2011/0225023 | A1* | 9/2011 | Evens | G06Q 30/02 705/7.31 |
| 2012/0191719 | A1* | 7/2012 | Musgrove | G06Q 30/0605 707/740 |
| 2012/0254076 | A1* | 10/2012 | Yang | G06F 16/5866 706/12 |
| 2014/0279294 | A1* | 9/2014 | Field-Darragh | G06Q 30/0282 705/28 |
| 2015/0161127 | A1* | 6/2015 | Oates | G06F 16/9535 707/726 |
| 2015/0182013 | A1* | 7/2015 | Yao | A46B 15/0051 132/120 |
| 2018/0197104 | A1* | 7/2018 | Marin | G06N 5/022 |
| 2019/0236740 | A1* | 8/2019 | Rao | G06N 20/20 |
| 2020/0034782 | A1* | 1/2020 | Hsieh | G06Q 30/0627 |
| 2020/0219171 | A1* | 7/2020 | Zhuang | G06Q 30/0639 |
| 2020/0279191 | A1* | 9/2020 | Koch | G06Q 30/0255 |
| 2021/0082024 | A1* | 3/2021 | Sivan | G06K 7/1417 |
| 2021/0166179 | A1* | 6/2021 | Pande | G06F 16/9535 |
| 2023/0081051 | A1* | 3/2023 | Brooks | G06Q 10/087 705/28 |

* cited by examiner

GENERATING AN INTERFACE DISPLAYING ITEMS OFFERED BY A WAREHOUSE THAT ACCOUNTS FOR PREDICTED AVAILABILITIES OF ITEMS DETERMINED FROM A TRAINED MODEL

BACKGROUND

This disclosure relates generally to displaying items offered by a warehouse through an interface generated by an online concierge system, and more specifically to determining an order in which items offered by the warehouse are displayed that accounts for predicted availabilities of the items at the warehouse.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

To simplify selection of items for inclusion in an order, an online concierge system attempts to show users a maximum number of items offered by a warehouse for the order. Such a display of a comprehensive listing of items offered by a warehouse increases a likelihood of a user identifying one or more items for inclusion in an order. However, an online concierge system has varying degrees of confidence that different items are available at the warehouse at different times and displaying items to a user that are not in stock at the warehouse complicates a user's ability to accurately and quickly identify whether an item is capable of being obtained from a warehouse when seeking to order the item through the online concierge system.

While a conventional online concierge system may hide or withhold display of items offered by a warehouse that are likely to be unavailable at the warehouse, withholding display of certain items may confuse customers without context as to why an item is not being shown. Further, preventing display of certain items may reduce user trust in the online concierge system, reducing subsequent interaction by the user with the online concierge system. Additionally, withholding display of certain items based on predicted availability may reduce a number of items included in orders by users. Further, for various items, a confidence of online concierge system has in the items being available may have a range where it is unclear whether the online concierge system should display an item or withhold display of the item to users.

SUMMARY

An online concierge system obtains an item catalog of items offered by one or more warehouses. In some embodiments, the online concierge system 102 obtains 505 an item catalog from each warehouse, with an item catalog from a warehouse identifying items offered by the warehouse. The item catalog includes different entries, with each entry including information identifying an item (e.g., an item identifier, an item name) and one or more attributes of the item. Example attributes of an item include: one or more keywords, a brand offering the item, a manufacturer of the item, a type of the item, a price of the item, a quantity of the item, a size of the item and any other suitable information. Additionally, one or more attributes of an item may be specified by the online concierge system for the item and included in the entry for the item in the item catalog. Example attributes specified by the online concierge system for an item include: a category for the item, one or more sub-categories for the item, and any other suitable information for the item.

When the online concierge system receives an identification of a warehouse from a user, the online concierge system retrieves the item catalog obtained for the identified warehouse. For example, the online concierge system receives a request for an order from a user that identifies the warehouse and retrieves an item catalog obtained for the identified warehouse identified by the request for the order. As another example, the online concierge system receives a request from the user to browse an inventory of a warehouse identified by the request and retrieves the item catalog obtained for the identified warehouse.

The online concierge system receives a search query for the warehouse from the user and selects a set of items from the item catalog of the warehouse that at least partially match the search query. In various embodiments, the online concierge system generates a relevance score for each item of the set. For example, the online concierge system applies a ranking model to the search query and to information describing various items in the item catalog. The ranking model outputs the relevance score for an item that is based on an amount of information describing the item matched by the search query in some embodiments. The relevance score may also account for a probability of the user including the item in an order. For example, the online concierge system identifies items of the item catalog for the identified warehouse for which the search query matches at least a portion of information describing the items. For each identified item, the online concierge system determines a probability of the user including the identified item in an order, or purchasing the identified item, by applying a trained purchase model to the user and to the identified item. The online concierge system may use the probability of the user purchasing the identified item as the relevance score for the identified item in some embodiments. In other embodiments, the online concierge system generates the relevance score for an identified item based on the probability of the user purchasing the identified item and the amount of the search query that matches information describing the item. Additionally, the relevance score for an identified item accounts for inclusion of the identified items in orders received from various users or selection of the item by various users of the online concierge system, allowing the organic score for the identified item to account for popularity of the identified item among users of the online concierge system.

From the relevance scores generated for various items, the online concierge system ranks the items. In various embodiments, the online concierge system ranks the items so items with larger relevance scores have higher positions in the ranking. As the relevance scores account for a quality of match between the search query and information describing items and may also account for a probability of the user purchasing items, items more relevant or more likely to be purchased have higher relevance scores and corresponding higher positions in the ranking. However, availability of items offered by the warehouse varies, and the relevance score for an item does not account for its availability at the warehouse when the online concierge system received the search query.

To increase a likelihood of the user selecting an item offered by the warehouse that is currently available at the warehouse from the set of items that at least partially match the search query, the online concierge system determines a confidence score for each item of the set based on a predicted availability of the item of the set. The online concierge system applies a machine-learned availability model to each combination of the identified warehouse and an item of the set, generating a predicted availability at the identified warehouse of each item of the set. In some embodiments, the confidence score for an item of the set is the predicted availability of the item of the set at the identified warehouse. Alternatively, the online concierge system determines the confidence score for an item of the set from the predicted availability of the item of the set and other features of the item and of the received search query. Example features used for determining the confidence score include a value indicating a degree with which information describing an item matches the received search query, a measure of specificity of the received search query, a probability of the item being replaced by one or more replacement items, a probability of the user subsequently requesting a refund of the item, and any other suitable information. The confidence score for an item of the set comprises a combination (e.g., a sum) of the predicted availability of the item of the set, and one or more other features of the item or of the search query in various embodiments. Different features, as well as the predicted availability of the item of the set, are weighted in various embodiments, with the confidence score for the item of the set determined as the weighted combination (e.g., sum) of the predicted availability of the item of the set and one or more other features.

As the confidence score for an item of the set is determined from the predicted availability of the item of the set, the confidence score provides a measure of a likelihood of the user being able to obtain the item of the set from the warehouse. To account for the predicted availabilities of items of the set, the online concierge system modifies the ranking of items of the set, which was based on relevance scores of the items of the set, based on the confidence scores for different items of the set. This allows the modified ranking to account for both the relevance scores of items of the set, which account for a relevance of items to the received search query and a likelihood of the user purchasing items, as well as the confidence scores of items of the set, which account for predicted availability of the items of the set at the warehouse when the search query was received.

In some embodiments, to modify the ranking, for an item of the set, the online concierge system determines a range of confidence scores including the confidence score of the item of the set. For example, the online concierge system maintains multiple ranges of confidence scores and determines a range including the confidence score of an item of the set. In various embodiments, a first range includes confidence scores indicating a high predicted availability of the item of the set at the warehouse, a second range includes confidence scores indicating a moderate predicted availability of the item of the set at the warehouse, and a third range includes confidence scores indicating a low predicted availability of the item of the set at the warehouse. The online concierge system performs different modifications to a position in the ranking of the item of the set depending on the range including the confidence score of the item. Referring to the previous example, in response to a confidence score of the item of the set being within a range of confidence scores indicating a high predicted availability of the item of the set (i.e., the first range in the preceding example), the position in the ranking of the item of the set is unchanged. However, in response to the confidence score of the item of the set being within a range of confidence scores indicating a moderate predicted availability of the item of the set (i.e., the second range in the preceding example), the online concierge system 102 decreases a position in the ranking of the item of the set by a specific number of positions (e.g., decreases the position in the ranking of the item by 10 positions, by 15 positions, etc.). Alternatively, in response to the confidence score of the item of the set being within a range of confidence scores indicating a moderate predicted availability of the item of the set (i.e., the second range in the preceding example), the online concierge system decreases a position in the ranking of the item of the set to less than a threshold position in the ranking; for example, the online concierge system decreases a position in the ranking of the item of the set to a position that is lower than a $25^{th}$ or a $30^{th}$ position in the ranking. In response to the confidence score of the item of the set being within a range of confidence scores indicating a low predicted availability of the item of the set (i.e., the third range in the preceding example), the online concierge system removes the item of the set from the ranking in some embodiments. Alternatively, in response to the confidence score of the item of the set being within the range of confidence scores indicating a low predicted availability of the item of the set, the online concierge system decreases a position of the item of the set in a ranking to a position that is below positions in the ranking of each item of the set having a confidence score in the range of confidence scores indicating a moderate predicted availability and stores an indication in association with the item of the set to display an indication that the item of the set has a low predicted availability in conjunction with the item of the set.

In some embodiments, the online concierge system prevents decreasing the position of an item of the set in response to the position in the ranking of the item of the set equaling or exceeding a threshold position. For example, the online concierge system determines whether the position in the ranking of the item of the set equals or exceeds the threshold position (e.g., determines whether the position in the ranking of the item of the set is not lower than a fifth position in the ranking). In response to determining the position in the ranking of the item of the set equals or exceeds the threshold position, the online concierge system maintains the position in the ranking of the item of the set without decreasing the position of the item of the set. However, in response to determining the position in the ranking of the item of the set is less than the threshold position, the online concierge system decreases the position of the item of the set, as further described above. This allows the online concierge system to prioritize ranking based on relevance of the item of the set to the search query when the relevance score of an item is higher relative to other items of the set.

Alternatively, rather than separately account for the relevance score and the confidence score to rank items of the set and to modify the ranking, respectively, the online concierge system generates a combined score for each item of the set, with the combined score for the item of the set comprising a combination of the relevance score of the item of the set and the confidence score of the item of the set. In various embodiments, the combined score of an item of the set is a sum of the relevance score of the item of the set and the confidence score of the item of the set. The online concierge system may weight one or more of the relevance score and the confidence score in various embodiments, with the combined scores of the item of the set a weighted sum, or other combination, of the relevance score and the confidence score in various embodiments. For example, the combined score for the item of the set is a sum of the relevance score for the item of the set and a product of a weight and the confidence score for the item of the set. In some embodiments, the online concierge system normalizes the relevance scores and determines the combined score for an item of the set as a sum, or other combination, of the normalized relevance score of the item of the set and a weighted confidence score of the item of the set. The online concierge system ranks the items of the set based on their corresponding combined scores. As the confidence score of an item of the set accounts for predicted availabilities of items of the set, the combined scores for items of the set allow the online concierge system to account for predicted availabilities of different items of the set when initially ranking items of the set.

In various embodiments, the online concierge system also determines a range of combined scores including the combined score of the item of the set. For example, the online concierge system maintains multiple ranges of combined scores and determines a range including the combined score of an item of the set. In various embodiments, a first range includes combined scores indicating a high predicted availability of the item of the set at the warehouse, a second range includes combined scores indicating a moderate predicted availability of the item of the set at the warehouse, and a third range includes combined scores indicating a low predicted availability of the item of the set at the warehouse. In various embodiments, the online concierge system stores different indications for display in conjunction with an item of the set based on a range including the combined score of the item of the set. For example, in response to a combined score of the item of the set being within a range of combined scores indicating a high predicted availability of the item of the set (i.e., the first range in the preceding example), the online concierge system does not display an indication in conjunction with the item of the set. However, in response to the combined score of the item of the set being within a range of combined scores indicating a moderate predicted availability of the item of the set (i.e., the second range in the preceding example), the online concierge system stores information in association with the item of the set to display an indication that the warehouse has a low inventory of the item of the set. In response to the combined score of the item of the set being within a range of combined scores indicating a low predicted availability of the item of the set (i.e., the third range in the preceding example), the online concierge system stores information in association with the item of the set to display an indication in conjunction with the item of the set that the item is unavailable or is likely unavailable at the warehouse. Alternatively, in response to the combined score of the item of the set being within a range of combined scores indicating a low predicted availability of the item of the set (i.e., the third range in the preceding example), the online concierge system removes the item of the set from the ranking. Hence, the online concierge system may account for predicted availabilities of items of the set when ranking the items of the set and provide additional indications to the user about predicted availability of items at the warehouse, increasing information available to the user for determining which items are likely to be available for inclusion in an order.

From the modified ranking, the online concierge system generates an interface identifying items of the set. The interface displays information describing different items of the set in different positions, with a position in the interface in which information describing an item in the set is displayed corresponding to a position of the item of the set in the modified ranking. For example, the interface comprises a vertical list including multiple positions, with each position displaying information describing an item of the set. A position in the vertical list in which information describing an item of the set is displayed corresponds to a position in the modified ranking of the item of the set. Hence, items of the set having higher positions in the modified ranking are displayed in corresponding higher positions of the vertical list, so items having higher positions in the modified ranking are more visible to the user. In another example, the interface comprises a horizontal list including multiple positions, with each position displaying information describing an item of the set. A position in the horizontal list in which information describing an item of the set is displayed corresponds to a position in the modified ranking of the item of the set, allowing items of the set having higher positions in the modified ranking to be more readily visible to the user. The online concierge system transmits the generated interface to a client device of the user for display, such as for display in a customer mobile interface.

In various embodiments, the interface displays additional information in conjunction with information describing an item of the set. For example, an indication of a predicted availability of an item of the set is displayed in conjunction with information describing the item of the set when the indication or information about the indication is stored in association with the item in the modified ranking. As further described above, in some embodiments, the online concierge system stores an indication that an item of the set has limited predicted availability at the warehouse in association with the item of the set in the modified ranking when a confidence score of the item of the set satisfies one or more criteria. When generating the interface, the online concierge system displays the indication proximate to information identifying the item of the set in a position of the interface, providing a visual indication to the user of the limited predicted availability of the item.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
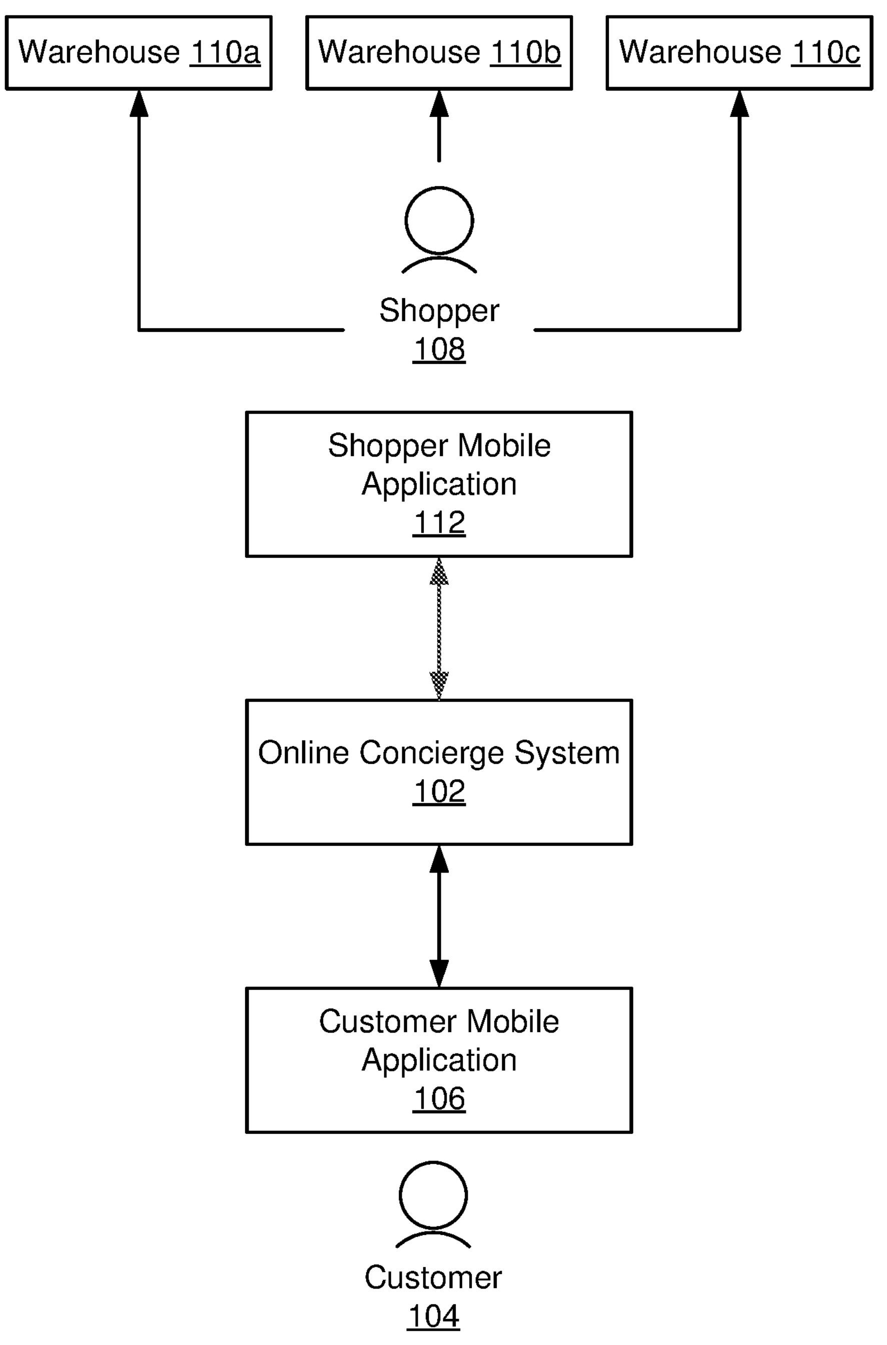
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110*a*" and/or "110*b*" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In some embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, or other person (or entity) who is enabled to fulfill orders received by the online concierge system 102. The shopper 108 travels between a warehouse and a delivery location (e.g., the customer's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110*a*, 110*b*, and 110*c* (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each shopper 108 fulfills an order received from the online concierge system 102 at one or more warehouses 110, delivers the order to the customer 104, or performs both fulfillment and delivery. In one embodiment, shoppers 108 make use of a shopper mobile application 112 which is configured to interact with the online concierge system 102.

Figure 2:
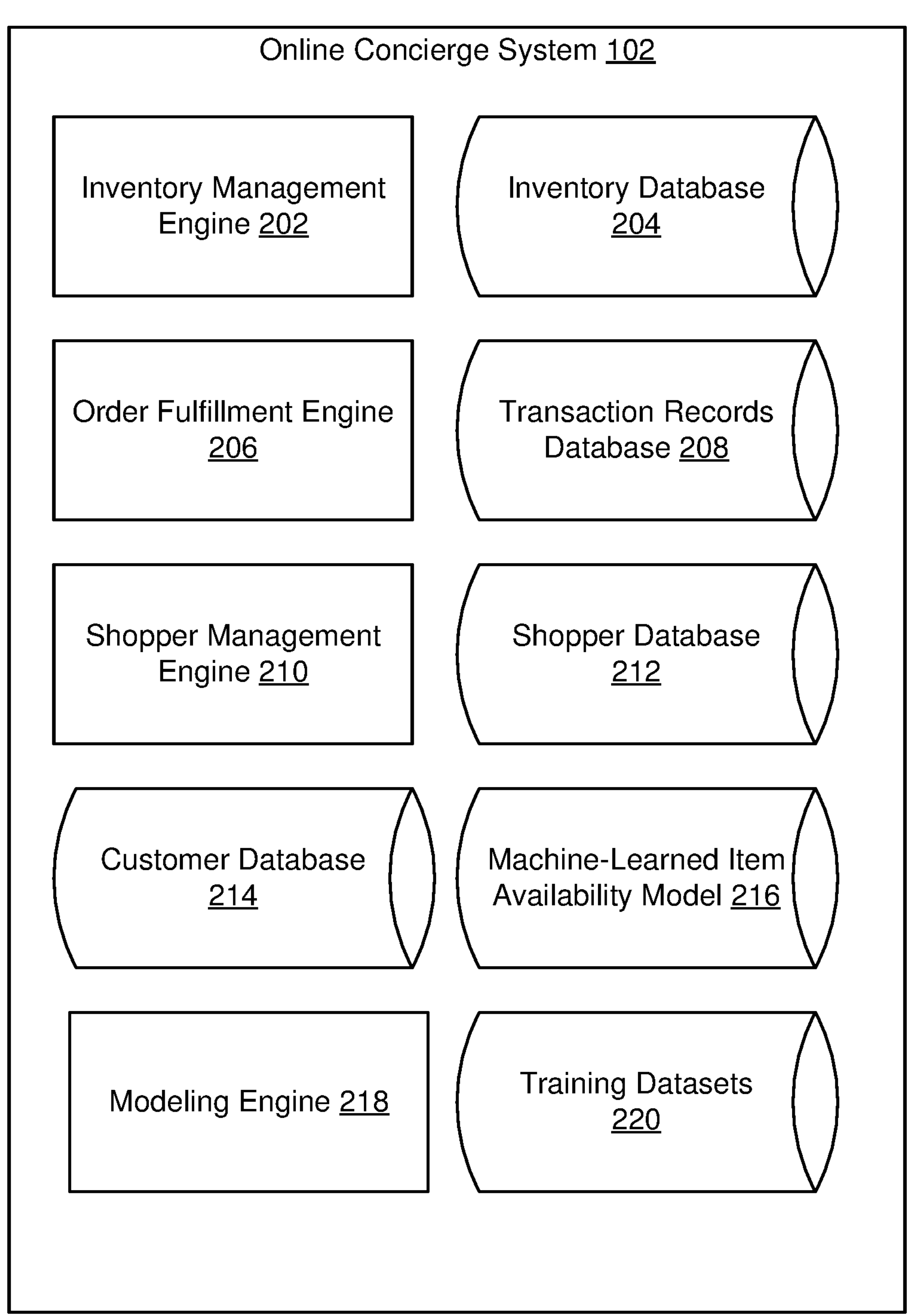
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

In various embodiments, the inventory management engine 202 maintains a taxonomy of items offered for purchase by one or more warehouses 110. For example, the inventory management engine 202 receives an item catalog from a warehouse 110 identifying items offered for purchase by the warehouse 110. From the item catalog, the inventory management engine 202 determines a taxonomy of items offered by the warehouse 110. Different levels in the taxonomy providing different levels of specificity about items included in the levels. For example, the taxonomy includes different categories for items, with categories in different levels of the taxonomy providing different levels of specificity for categories, with lower levels in the hierarchy corresponding to more specific categories, and a lowest level of the hierarchy identifying different specific items. In various embodiments, the taxonomy identifies a generic item description and associates one or more specific items with the generic item identifier. For example, a generic item description identifies "milk," and the taxonomy associates identifiers of different milk items (e.g., milk offered by different brands, milk having one or more different attributes, etc.), with the generic item identifier. Thus, the taxonomy maintains associations between a generic item description and specific items offered by the warehouse 110 marching the generic item description. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a generic item description, while items in higher levels of the hierarchical taxonomy have a fewer number of attributes, corresponding to less specificity in a generic item description. In various embodiments, higher levels in the taxonomy include less detail about items, so greater numbers of items are included in higher levels (e.g., higher levels include a greater number of items satisfying a broader generic item description). Similarly, lower levels in the taxonomy include greater detail about items, so fewer numbers of items are included in the lower levels (e.g., higher levels include a fewer number of items satisfying a more specific generic item description). The taxonomy may be received from a warehouse 110 in various embodiments. In other embodiments, the inventory management engine 202 applies a trained classification module to an item catalog received from a warehouse 110 to include different items in levels of the taxonomy, so application of the trained classification model associates specific items with generic item descriptions corresponding to levels within the taxonomy.

Inventory information provided by the inventory management engine 202 may supplement the training datasets 220.

Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the customer 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on.

In some embodiments, the order fulfillment engine 206 generates an interface identifying items offered by an identified warehouse 110 in response to receiving a search query from a user for an item. The interface displays information identifying different items offered by the warehouse in different positions. As further described below in conjunction with FIG. 5, in response to receiving a search query, the order fulfillment engine 206 selects a set of items offered by the warehouse 110 associated with information that at least partially matches the search query. For example, the set of items includes items with titles or names that match at least a portion of the search query. For each item of the set, the order fulfillment engine 206 generates a relevance score that is based at least in part on an amount of information associated with the item of the set matching the search query. Alternatively or additionally, the order fulfillment engine 206 applies a trained purchase model to the user and an item of the set, generating a probability of the user including the item in an order. The relevance score of the item of the set may be the probability of the user including the item of the set in an order in some embodiments, while in other embodiments, the relevance score of the item of the set is a combination of the probability of the user including the item of the set in an order and an amount of information associated with the item of the set matched by the search query. Generation of the relevance score is further described below in conjunction with FIG. 5.

While the relevance score accounts for a probability of the user including an item of the set in the order or an amount of information associated with an item of the set matching the search query, the warehouse 110 for which the search query was received has varying availabilities of different items. Failing to account for predicted availabilities of different items at the warehouse 110 when ranking items of the set may result in items that are currently unavailable at the warehouse 110 but that have high relevance scores being displayed in prominent positions of the interface. Such prominent display of unavailable items in the interface may discourage subsequent orders from the user or prevent the user from creating an order in response to the search query. To account for predicted item availabilities at the warehouse, the online concierge system 102 applies the machine-learned item availability model 216, further described below in conjunction with FIG. 4, to combinations of items of the set and the identified warehouse 110. The order fulfillment engine 206 receives the predicted availability of each item of the set from the machine-learned item availability model 216 and generates a confidence score for each item of the set from the predicted availability of the item of the set. As further described below in conjunction with FIG. 5, the confidence score of an item of the set is a combination of the predicted availability of the item of the set and one or more other factors in various embodiments. In some embodiments, the order fulfillment engine 206 ranks items of the set based on their relevance scores and modifies positions of one or more items in the ranking based on the confidence scores for the one or more items in the ranking, as further described below in conjunction with FIG. 5. For example, the order fulfillment engine 206 decreases a position in the ranking of an item having a confidence score less than a threshold value or having a confidence score within a specific range. The order fulfillment engine 206 generates the interface from the modified ranking, so positions in the interface of information describing items of the set accounts for the confidence score (based on predicted availability) of items of the set. Alternatively, the order fulfillment engine 206 calculates a combined score for each item of the set by combining a relevance score of the item of the set and a confidence score of the item of the set. The order fulfillment engine 206 ranks the items of the set based on their combined scores and generates the interface based on positions of the items of the set in the ranking.

Machine Learning Model

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110, also referred to as a predicted availability of the item at the warehouse 110. The machine-learned item availability model 216 may be used to predict item availability for items being displayed to or selected by a customer or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the customer 104 and/or shopper 108, as described in further detail below.

In various embodiments, the modeling engine 218 maintains a trained purchase model that outputs a probability of a user including an item in an order based on an embedding, or other representation, of the user and an embedding, or other representation, of the item For example, the trained purchase model is applied to a user embedding of a user and to an embedding of an item and outputs a probability of the user including the item in an order (i.e., of the user purchasing the item). The trained purchase model may be trained based on prior inclusion of items in orders received from the user from data in the training datasets 220. The trained purchase model may be any suitable machine learning model trained (e.g., using supervised learning, semi-supervised learning, etc.) from labeled data identifying embeddings of items previously displayed to the user, with the labels indicating whether the user included the item in an order after being displayed with the item.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others, or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability, and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108. Following updating of the training datasets 220, a modeling engine 218 may retrain a model with the updated training datasets 220 and produce a new machine-learned item availability model 216.

Customer Mobile Application

Figure 3A:
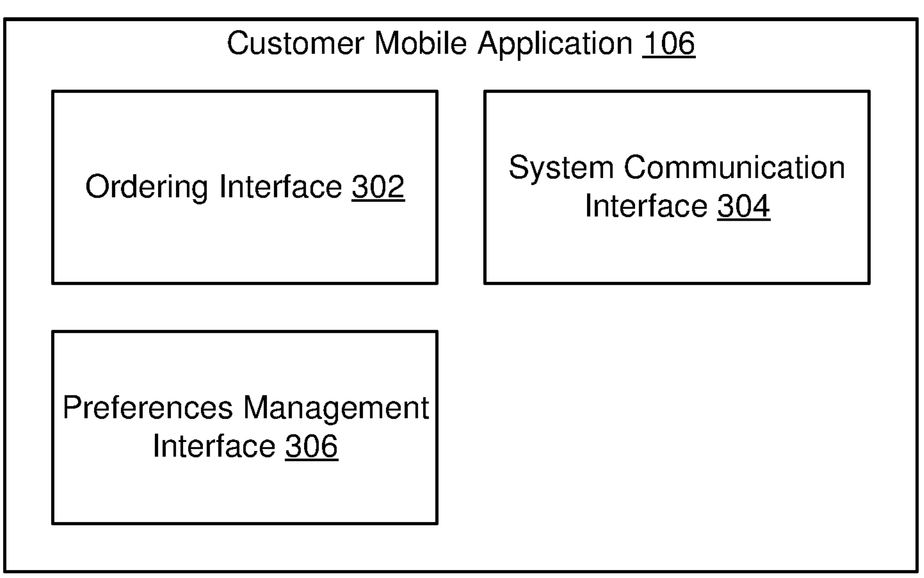
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, and so on.

Shopper Mobile Application

Figure 3B:
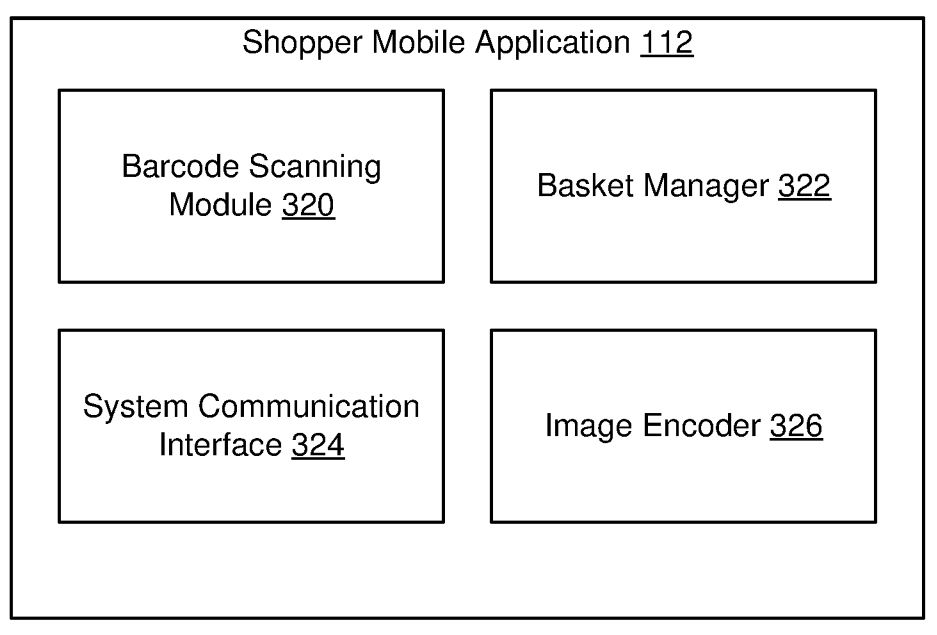
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
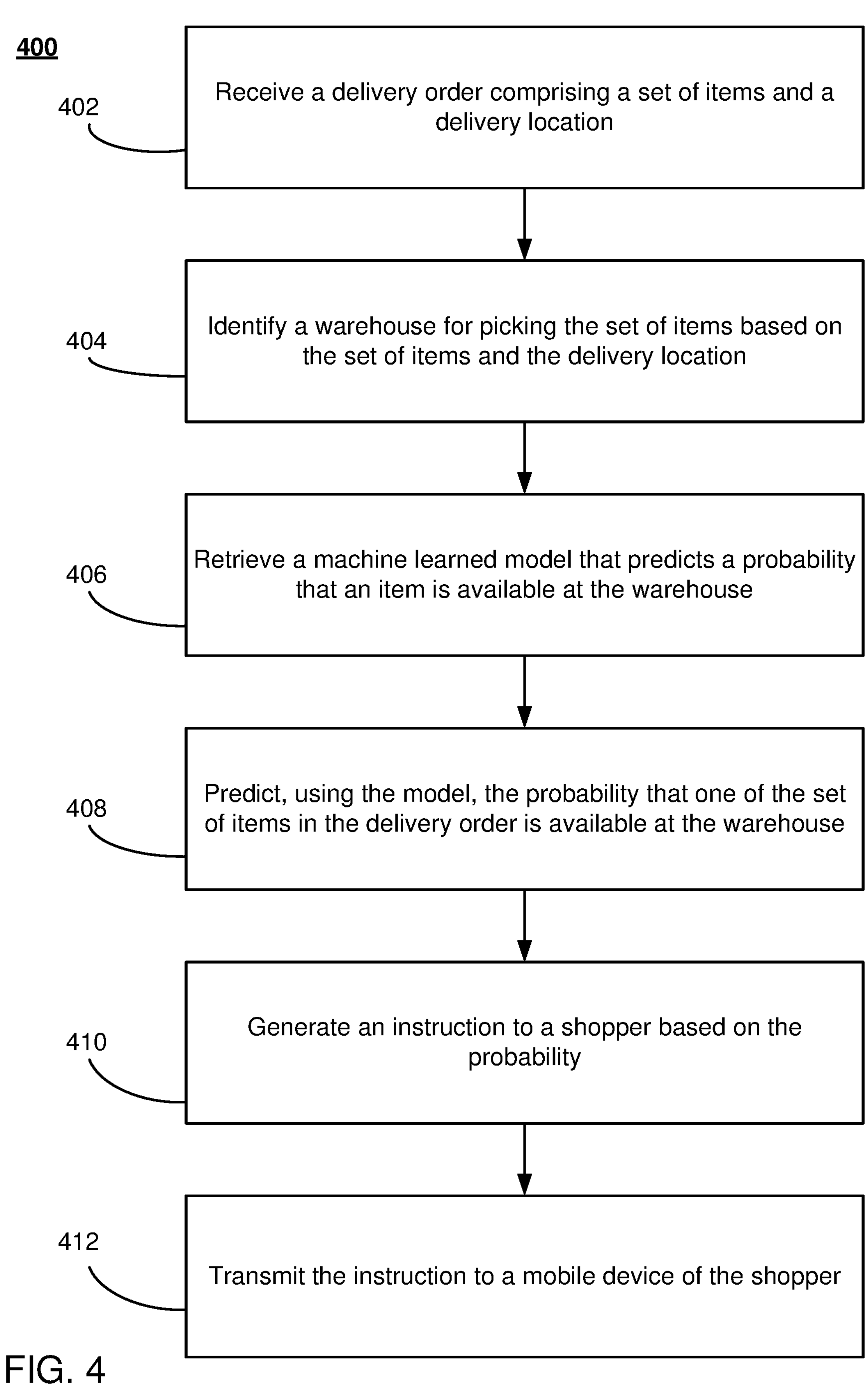
FIG. 4 is a flowchart illustrating a process for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability. In some other examples, the order fulfillment engine 206 sends a message and/or instruction to a user based on the probability predicted by the machine-learned item availability model 216.

Figure 5:
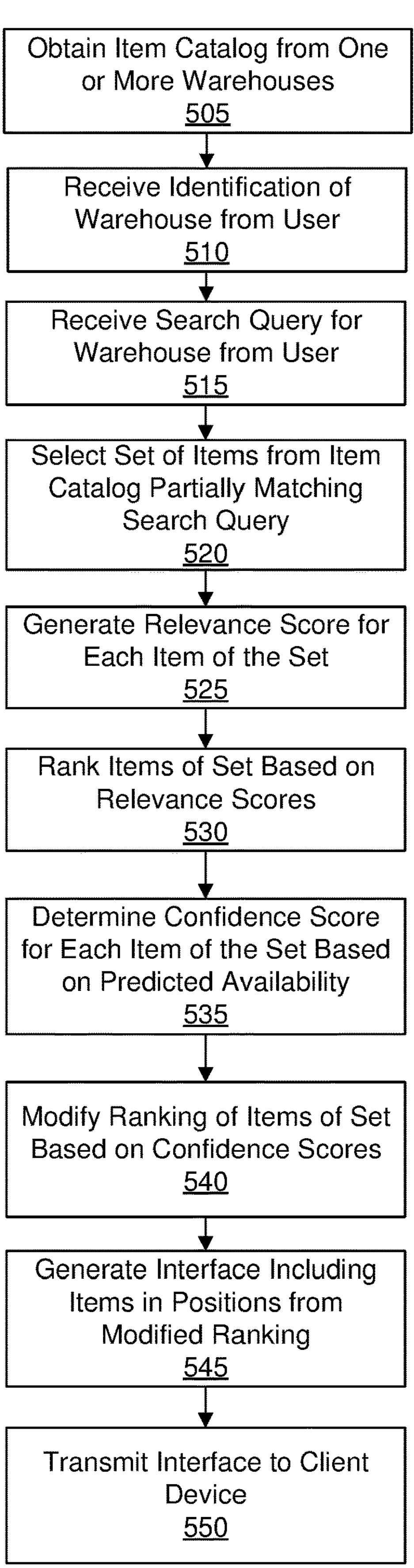
FIG. 5 is a flowchart of a method for generating an interface displaying items offered by a warehouse to a user that accounts for predicted availability of the items, according to one embodiment.

Accounting for Predicted Item Availabilities when Generating an Interface Displaying Items Offered by a Warehouse FIG. 5 is a flowchart of one embodiment of a method for an online concierge system 102 generating an interface displaying items offered by a warehouse 110 to a user that accounts for predicted availability of the items. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

The online concierge system 102 obtains 505 an item catalog of items offered by one or more warehouses 110. In some embodiments, the online concierge system 102 obtains 505 an item catalog from each warehouse 110, with an item catalog from a warehouse identifying items offered by the warehouse 110. The item catalog includes different entries, with each entry including information identifying an item (e.g., an item identifier, an item name) and one or more attributes of the item. Example attributes of an item include: one or more keywords, a brand offering the item, a manufacturer of the item, a type of the item, a price of the item, a quantity of the item, a size of the item and any other suitable information. Additionally, one or more attributes of an item may be specified by the online concierge system 102 for the item and included in the entry for the item in the item catalog. Example attributes specified by the online concierge system 102 for an item include: a category for the item, one or more sub-categories for the item, and any other suitable information for the item.

When the online concierge system 102 receives 510 an identification of a warehouse 110 from a user, the online concierge system 102 retrieves the item catalog obtained 505 for the identified warehouse 110. For example, the online concierge system 102 receives a request for an order from a user that identifies the warehouse 110 and retrieves an item catalog obtained 505 for the identified warehouse 110 identified by the request for the order. As another example, the online concierge system 102 receives 510 a request from the user to browse an inventory of a warehouse identified by the request and retrieves the item catalog obtained 505 for the identified warehouse 110.

The online concierge system 102 receives 515 a search query for the warehouse 110 from the user and selects 520 a set of items from the item catalog of the warehouse 110 that at least partially match the search query. In various embodiments, the online concierge system 102 generates 525 a relevance score for each item of the set. For example, the online concierge system 102 applies a ranking model to the search query and to information describing various items in the item catalog. The ranking model outputs the relevance score for an item that is based on an amount of information describing the item matched by the search query in some embodiments. The relevance score may also account for a probability of the user including the item in an order. For example, the online concierge system 102 identifies items of the item catalog for the identified warehouse 110 for which the search query matches at least a portion of information describing the items. For each identified item, the online concierge system 102 determines a probability of the user including the identified item in an order, or purchasing the identified item, by applying a trained purchase model to the user and to the identified item. The online concierge system 102 may use the probability of the user purchasing the identified item as the relevance score for the identified item in some embodiments. In other embodiments, the online concierge system 102 generates 525 the relevance score for an identified item based on the probability of the user purchasing the identified item and the amount of the search query that matches information describing the item. Additionally, the relevance score for an identified item accounts for inclusion of the identified items in orders received from various users or selection of the item by various users of the online concierge system 102, allowing the organic score for the identified item to account for popularity of the identified item among users of the online concierge system 102.

From the relevance scores generated 525 for various items, the online concierge system 102 ranks 530 the items. In various embodiments, the online concierge system 102 ranks 530 the items so items with larger relevance scores have higher positions in the ranking. As the relevance scores account for a quality of match between the search query and information describing items, and may also account for a probability of the user purchasing items, items more relevant or more likely to be purchased have higher relevance scores and corresponding higher positions in the ranking. However, availability of items offered by the warehouse 110 varies, and the relevance score for an item does not account for its availability at the warehouse 110 when the online concierge system received 515 the search query.

To increase a likelihood of the user selecting an item offered by the warehouse 110 that is currently available at the warehouse from the set of items that at least partially match the search query, the online concierge system 102 determines 535 a confidence score for each item of the set based on a predicted availability of the item of the set. The online concierge system 102 applies the machine-learned availability model 216 to each combination of the identified warehouse 110 and an item of the set, generating a predicted availability at the identified warehouse 110 of each item of the set. In some embodiments, the confidence score for an item of the set is the predicted availability of the item of the set at the identified warehouse 110. Alternatively, the online concierge system 102 determines 535 the confidence score for an item of the set from the predicted availability of the item of the set and other features of the item and of the received search query. Example features used for determining 535 the confidence score include a value indicating a degree with which information describing an item matches the received search query, a measure of specificity of the received search query, a probability of the item being replaced by one or more replacement items, a probability of the user subsequently requesting a refund of the item, and any other suitable information. The confidence score for an item of the set comprises a combination (e.g., a sum) of the predicted availability of the item of the set, and one or more other features of the item or of the search query in various embodiments. Different features, as well as the predicted availability of the item of the set, are weighted in various embodiments, with the confidence score for the item of the set determined 535 as the weighted combination (e.g., sum) of the predicted availability of the item of the set and one or more other features.

As the confidence score for an item of the set is determined 535 from the predicted availability of the item of the set, the confidence score provides a measure of a likelihood of the user being able to obtain the item of the set from the warehouse 110. To account for the predicted availabilities of items of the set, the online concierge system 102 modifies 540 the ranking of items of the set, which was based on relevance scores of the items of the set, based on the confidence scores for different items of the set. This allows the modified ranking to account for both the relevance scores of items of the set, which account for a relevance of items to the received search query and a likelihood of the user purchasing items, as well as the confidence scores of items of the set, which account for predicted availability of the items of the set at the warehouse 110 when the search query was received 515.

For example, the online concierge system 102 determines whether a confidence score of an item of the set equals or exceeds a threshold value. In response to determining the confidence score does not equal or exceed the threshold value, the online concierge system 102 decreases a position in the ranking of the item of the set. In some embodiments, the online concierge system 102 decreases the position of the item of the set by a specific number of positions, while in other embodiments the online concierge system 102 decreases a position of the item of the set to a position that is lower than a specific position in the ranking. However, in response to determining that the confidence score equals or exceeds the threshold value, the online concierge system 102 does not alter the position in the ranking of the item of the set.

In some embodiments, to modify 540 the ranking, for an item of the set, the online concierge system 102 determines a range of confidence scores including the confidence score of the item of the set. For example, the online concierge system 102 maintains multiple ranges of confidence scores and determines a range including the confidence score of an item of the set. In various embodiments, a first range includes confidence scores indicating a high predicted availability of the item of the set at the warehouse 110, a second range includes confidence scores indicating a moderate predicted availability of the item of the set at the warehouse 110, and a third range includes confidence scores indicating a low predicted availability of the item of the set at the warehouse 110. The online concierge system 102 performs different modifications to a position in the ranking of the item of the set depending on the range including the confidence score of the item. Referring to the previous example, in response to a confidence score of the item of the set being within a range of confidence scores indicating a high predicted availability of the item of the set (i.e., the first range in the preceding example), the position in the ranking of the item of the set is unchanged. However, in response to the confidence score of the item of the set being within a range of confidence scores indicating a moderate predicted availability of the item of the set (i.e., the second range in the preceding example), the online concierge system 102 decreases a position in the ranking of the item of the set by a specific number of positions (e.g., decreases the position in the ranking of the item by 10 positions, by 15 positions, etc.). Alternatively, in response to the confidence score of the item of the set being within a range of confidence scores indicating a moderate predicted availability of the item of the set (i.e., the second range in the preceding example), the online concierge system 102 decreases a position in the ranking of the item of the set to less than a threshold position in the ranking; for example, the online concierge system 102 decreases a position in the ranking of the item of the set to a position that is lower than a $25^{th}$ or a $30^{th}$ position in the ranking. In response to the confidence score of the item of the set being within a range of confidence scores indicating a low predicted availability of the item of the set (i.e., the third range in the preceding example), the online concierge system 102 removes the item of the set from the ranking in some embodiments. Alternatively, in response to the confidence score of the item of the set being within the range of confidence scores indicating a low predicted availability of the item of the set, the online concierge system 102 decreases a position of the item of the set in a ranking to a position that is below positions in the ranking of each item of the set having a confidence score in the range of confidence scores indicating a moderate predicted availability and stores an indication in association with the item of the set to display an indication that the item of the set has a low predicted availability in conjunction with the item of the set.

In some embodiments, the online concierge system 102 prevents decreasing the position of an item of the set in response to the position in the ranking of the item of the set equaling or exceeding a threshold position. For example, the online concierge system 102 determines whether the position in the ranking of the item of the set equals or exceeds the threshold position (e.g., determines whether the position in the ranking of the item of the set is not lower than a fifth position in the ranking). In response to determining the position in the ranking of the item of the set equals or exceeds the threshold position, the online concierge system 102 maintains the position in the ranking of the item of the set without decreasing the position of the item of the set. However, in response to determining the position in the ranking of the item of the set is less than the threshold position, the online concierge system 102 decreases the position of the item of the set, as further described above. This allows the online concierge system 102 to prioritize ranking based on relevance of the item of the set to the search query when the relevance score of an item is higher relative to other items of the set.

Alternatively, rather than separately account for the relevance score and the confidence score to rank 530 items of the set and to modify 540 the ranking, respectively, the online concierge system 102 generates a combined score for each item of the set, with the combined score for the item of the set comprising a combination of the relevance score of the item of the set and the confidence score of the item of the set. In various embodiments, the combined score of an item of the set is a sum of the relevance score of the item of the set and the confidence score of the item of the set. The online concierge system 102 may weight one or more of the relevance score and the confidence score in various embodiments, with the combined scores of the item of the set a weighted sum, or other combination, of the relevance score and the confidence score in various embodiments. For example, the combined score for the item of the set is a sum of the relevance score for the item of the set and a product of a weight and the confidence score for the item of the set. In some embodiments, the online concierge system 102 normalizes the relevance scores and determines the combined score for an item of the set as a sum, or other combination, of the normalized relevance score of the item of the set and a weighted confidence score of the item of the set. The online concierge system 102 ranks the items of the set based on their corresponding combined scores. As the confidence score of an item of the set accounts for predicted availabilities of items of the set, the combined scores for items of the set allow the online concierge system 102 to account for predicted availabilities of different items of the set when initially ranking items of the set.

In various embodiments, the online concierge system 102 also determines a range of combined scores including the combined score of the item of the set. For example, the online concierge system 102 maintains multiple ranges of combined scores and determines a range including the combined score of an item of the set. In various embodiments, a first range includes combined scores indicating a high predicted availability of the item of the set at the warehouse 110, a second range includes combined scores indicating a moderate predicted availability of the item of the set at the warehouse 110, and a third range includes combined scores indicating a low predicted availability of the item of the set at the warehouse 110. In various embodiments, the online concierge system 102 stores different indications for display in conjunction with an item of the set based on a range including the combined score of the item of the set. For example, in response to a combined score of the item of the set being within a range of combined scores indicating a high predicted availability of the item of the set (i.e., the first range in the preceding example), the online concierge system 102 does not display an indication in conjunction with the item of the set. However, in response to the combined score of the item of the set being within a range of combined scores indicating a moderate predicted availability of the item of the set (i.e., the second range in the preceding example), the online concierge system 102 stores information in association with the item of the set to display an indication that the warehouse 110 has a low inventory of the item of the set. In response to the combined score of the item of the set being within a range of combined scores indicating a low predicted availability of the item of the set (i.e., the third range in the preceding example), the online concierge system 102 stores information in association with the item of the set to display an indication in conjunction with the item of the set that the item is unavailable or is likely unavailable at the warehouse 110. Alternatively, in response to the combined score of the item of the set being within a range of combined scores indicating a low predicted availability of the item of the set (i.e., the third range in the preceding example), the online concierge system 102 removes the item of the set from the ranking. Hence, the online concierge system 102 may account for predicted availabilities of items of the set when ranking the items of the set and provide additional indications to the user about predicted availability of items at the warehouse 110, increasing information available to the user for determining which items are likely to be available for inclusion in an order.

From the modified ranking, the online concierge system 102 generates 545 an interface identifying items of the set. The interface displays information describing different items of the set in different positions, with a position in the interface in which information describing an item in the set is displayed corresponding to a position of the item of the set in the modified ranking. For example, the interface comprises a vertical list including multiple positions, with each position displaying information describing an item of the set. A position in the vertical list in which information describing an item of the set is displayed corresponds to a position in the modified ranking of the item of the set. Hence, items of the set having higher positions in the modified ranking are displayed in corresponding higher positions of the vertical list, so items having higher positions in the modified ranking are more visible to the user. In another example, the interface comprises a horizontal list including multiple positions, with each position displaying information describing an item of the set. A position in the horizontal list in which information describing an item of the set is displayed corresponds to a position in the modified ranking of the item of the set, allowing items of the set having higher positions in the modified ranking to be more readily visible to the user. The online concierge system 102 transmits 550 the generated interface to a client device of the user for display, such as for display in the customer mobile interface 106.

In various embodiments, the interface displays additional information in conjunction with information describing an item of the set. For example, as further described above, an indication of a predicted availability of an item of the set is displayed in conjunction with information describing the item of the set when the indication or information about the indication is stored in association with the item in the modified ranking. As further described above, in some embodiments, the online concierge system 102 stores an indication that an item of the set has limited predicted availability at the warehouse 110 in association with the item of the set in the modified ranking when a confidence score of the item of the set satisfies one or more criteria. When generating 545 the interface, the online concierge system 102 displays the indication proximate to information identifying the item of the set in a position of the interface, providing a visual indication to the user of the limited predicted availability of the item.

Figure 6:
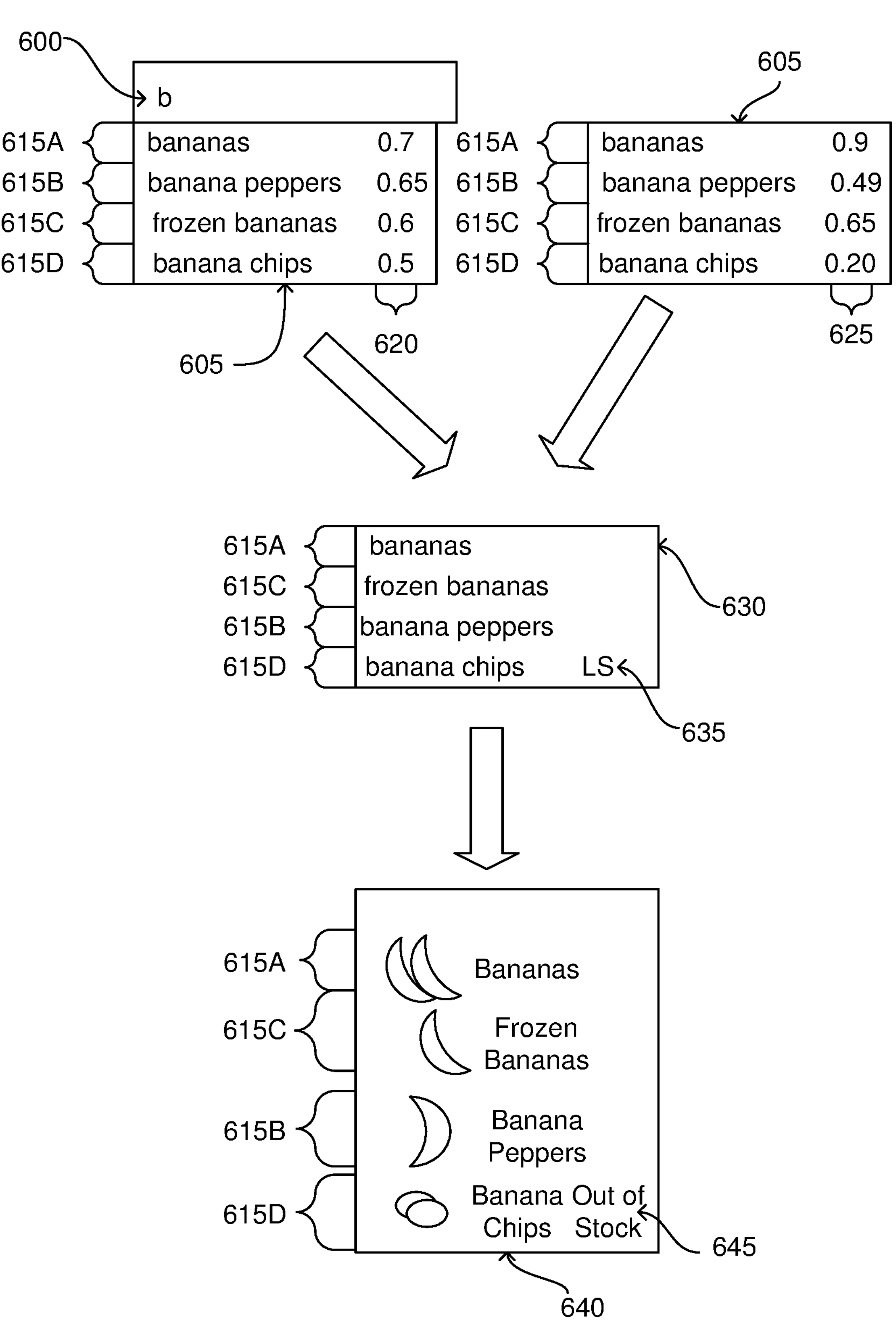
FIG. 6 is a process flow diagram of a method for generating an interface displaying items offered by a warehouse to a user that accounts for predicted availability of the items, according to one embodiment.

FIG. 6 is a process flow diagram of a method for an online concierge system 102 generating an interface displaying items offered by a warehouse 110 to a user that accounts for predicted availability of the items. In the example shown by FIG. 6, the online concierge system 102 has received an identification of a warehouse 110 and a search query 600 for items offered by the warehouse 110 from the user. Based on the search query 600, the online concierge system 102 selects a set 605 of items offered by the warehouse 110 having information that is at least partially matched by the search query 600. For purposes of illustration, the set 605 of items shown in FIG. 6 includes item 615A, 615B, 615C, 615D (also individually and collectively referred to using reference number 615), each of which is associated with information that at least partially matches the search query 600. As further described above in conjunction with FIG. 5, the online concierge system 102 determines a relevance score 620 for each item 615. In various embodiments, the relevance score for an item 615 is based on an amount of information associated with the item 615 (e.g., a name or a description of the item 615) matching the search query 600. In various embodiments, the relevance score 620 for an item 615 also accounts for a probability of the user including the item 615 in an order for example, the relevance score is a combination of a value based on the amount of information associated with the item 615 matching the search query 600 and the probability of the user including the item 615 in an order. Alternatively, the relevance score 620 of the item 615 is the probability of the user including the item in an order.

As shown in FIG. 6, in various embodiments, the online concierge system 102 ranks the items 615 of the set 605 based on their corresponding relevance scores 620. For example, items 615 with higher relevance scores have higher positions in the ranking. While this allows the ranking of the items 615 to account for probabilities of the user purchasing different items 615 and a relevance of different items 615 to the search query 605, the warehouse 110 for which the search query 605 was received has differing availabilities of different items 615. Hence, items 615 with higher relevance scores 620 may be unavailable for purchase from the warehouse 110 despite having high positions in the ranking based on relevance scores 620.

To account for availability of different items 615 at the warehouse 110, the online concierge system 102 determines a confidence score 625 for each item 615 of the set 605. As further described above in conjunction with FIG. 5, the confidence score 625 for an item 615 is based on a predicted availability of the item 615 at the warehouse 110, and may account for other factors, such as an availability of replacement items for the item 615 at the warehouse 110, a level of specificity of the search query 600, as well as other factors, as further described above in conjunction with FIG. 5. The online concierge system 102 modifies the ranking of items 615 of the set 605 based on the confidence scores 625 for each item 615 of the set, resulting in a modified ranking 630 of the items 615. In the example shown by FIG. 6, the confidence score 625 for item 615B indicates a moderate predicted availability of item 615B at the warehouse 110, so the online concierge system 102 decreases a position of item 615B in the modified ranking 630 relative to a position of item 615 in the ranking based on relevance scores 620. Similarly, in the example shown by FIG. 6, item 615D has a confidence score 625 indicating a low predicted availability of item 615D at the warehouse 110. As item 615D has a lowest position in the ranking based on relevance scores 620, the online concierge system 102 does not demote item 615D to a lower position in the modified ranking 630 but stores an indication 635 indicating item 615D has limited or low availability in association with item 615D in the modified ranking 630.

From the modified ranking 630, the online concierge system 102 generates an interface 640 for display to the user. The interface 640 includes different positions, with each position displaying information describing an item 615. In various embodiments, a position of an item 615 in the modified ranking 630 corresponds to a position in the interface 640 in which information describing an item 615 is displayed. Hence, in the example of FIG. 6, the interface 640 displays information describing item 615A in a topmost position and displays information describing item 615C, 615B, 615D, respectively, in subsequent positions. In the example of FIG. 6, an indication 645 that item 615D has low predicted availability is displayed in the interface 640 in conjunction with information describing item 615D. Alternatively, item 615D, or other items with which an indication 635 of low predicted availability was stored in the modified ranking 630 are withheld from display in the interface 640. As the modified ranking 630 accounts for predicted availabilities of items 615 at the warehouse 110 from the confidence scores 625 for items, using the modified ranking 630 to determine an order in which information describing items 615 are displayed allows the interface 640 to more prominently identify items 615 having greater predicted availability, while accounting for relevance of items 615 to the search query 600. This allows information identifying items 615 more relevant, and more likely to be available at the warehouse 110, to be more easily accessible to the user via the interface 640, reducing an amount of interaction with the online concierge system 102 by the user to identify items 615 both relevant to the search query 600 and likely to be available at the warehouse 110. Additionally, in embodiments where items with confidence scores indicating a low predicted availability of item at the warehouse 110 are displayed in the interface 640 in positions of items with confidence scores indicating high or moderate availability at the warehouse 110, a user with specific criteria for an item (e.g., a particular brand, one or more particular attributes) is capable of locating an item with low predicted availability that satisfies the specific criteria by navigating through the interface 640, allowing the interface 640 to simplify access to items more likely to be available at the warehouse 110, while allowing users to account for specific criteria to identify particular items when the particular items have low predicted availabilities.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

obtaining, at an online system, an item database describing items at one or more locations;

receiving, at the online system, an identification of the location from a user of the online system;

receiving a search query to identify one or more items offered by the location at the online system;

selecting, by the online system, a set of items offered by the location from the item database for the location, each item of the set associated with information that is at least partially matched by the search query;

applying a machine-learned predictive model to data describing the user and each item of the set to output a likelihood of the user interacting with each item of the set, wherein the machine-learned predictive model is trained by:

accessing historical data comprising historical user interactions with items;

generating embeddings for users and items based on the historical data;

associating each user-item pair with a label indicating whether the user interacted with the item;

applying the machine-learned predictive model to each user-item pair to output a predicted probability that the user will interact with the item; and adjusting parameters of the machine-learned predictive model to reduce an error between the predicted probability and the label;

generating, by the online system, a relevance score for each item of the set based on an amount of information describing the item matched by the search query and the likelihood of the user including the respective item in an order;

ranking, by the online system, the items of the set based on the relevance scores;

determining, by the online system, a predicted availability of each item of the set using a machine learned availability model that is trained to predict a likelihood that an item is available, wherein the availability model is trained by:

receiving a plurality of attributes associated with a plurality of items, receiving, for each item of the plurality of items, a label indicating an availability of the item, applying the availability model to each of the plurality of items to determine a difference between the label and the predicted likelihood of the respective item, updating the label of the respective item based on the determined difference, and updating the availability model for each of the plurality of items using the updated labels;

determining, by the online system, a confidence score for each item of the set, wherein determining the confidence score comprises computing a weighted sum of at least the relevance score and the predicted availability of the respective item;

modifying, by the online system, the ranking of the items of the set by adjusting a position in the ranking of the item of the set based on the confidence score for the item of the set;

repositioning, by the online system, visual representations of the items within a graphical user interface according to their modified rankings, such that higher-ranked items are displayed at more prominent locations, wherein repositioning includes promoting or demoting, within the graphical user interface, a position of an item relative to other items based on the confidence score of the item relative to the other items; and transmitting the user interface from the online system to a client device of the user for display.

2. The method of claim 1, wherein the confidence score of the item of the set is further calculated using one or more selected from a group consisting of: a degree with which information describing the item of the set, a measure of specificity of the search query, and a probability of the item of the set being replaced by one or more replacement items.

3. The method of claim 1, wherein modifying, by the online system, the ranking of the items of the set by adjusting a position in the ranking of the item of the set based on the confidence score for the item of the set comprises:

retrieving ranges of confidence scores maintained by the online system;

determining a range of confidence scores including the confidence score of the item of the set; and responsive to the determined range of confidence scores indicating a moderate predicted availability of the item of the set, decreasing the position in the ranking of the item of the set.

4. The method of claim 3, wherein decreasing the position in the ranking of the item of the set comprises:

decreasing the position in the ranking of the item of the set by a specific number of positions.

5. The method of claim 3, wherein decreasing the position in the ranking of the item of the set comprises:

decreasing the position in the ranking of the item of the set to an alternative position that is lower than a specific position in the ranking.

6. The method of claim 3, further comprising:

responsive to the determined range of confidence scores indicating a low predicted availability of the item of the set, decreasing the position in the ranking of the item of the set, decreasing a position of the item of the set in the ranking to a position that is below positions in the ranking of each item of the set having a confidence score in the range of confidence scores indicating the moderate predicted availability and storing an indication in association with the item of the set that the item of the set has a low predicted availability.

7. The method of claim 6, further comprising:

displaying information describing the item of the set in the position that is below positions in the ranking of each item of the set having the confidence score in the range of confidence scores indicating the moderate predicted availability and displaying the indication the item of the set has the low predicted availability in conjunction with the information describing the item of the set in the position that is below positions in the ranking of each item of the set having the confidence score in the range of confidence scores indicating the moderate predicted availability.

8. The method of claim 3, further comprising:

responsive to the determined range of confidence scores indicating a low predicted availability of the item of the set, removing the item of the set from the ranking.

9. The method of claim 3, wherein decreasing the position in the ranking of the item of the set comprises:

determining that the position in the ranking of the item of the set equals or exceeds a threshold position; and in response to determining that the position in the ranking of the item of the set equals or exceeds a threshold position, maintaining the position in the ranking of the item of the set.

10. A system comprising:

one or more processors; and a non-transitory computer readable medium having instructions encoded thereon, that when executed by the one or more processors, cause the one or more processors to perform steps including:

obtaining, at an online system, an item database describing items at one or more locations;

receiving, at the online system, an identification of the location from a user of the online system;

receiving a search query to identify one or more items offered by the location at the online system;

selecting, by the online system, a set of items offered by the location from the item database for the location, each item of the set associated with information that is at least partially matched by the search query;

applying a machine-learned predictive model to data describing the user and each item of the set to output a likelihood of the user interacting with each item of the set, wherein the machine-learned predictive model is trained by:

accessing historical data comprising historical user interactions with items;

generating embeddings for users and items based on the historical data;

associating each user-item pair with a label indicating whether the user interacted with the item;

applying the machine-learned predictive model to each user-item pair to output a predicted probability that the user will interact with the item; and adjusting parameters of the machine-learned predictive model to reduce an error between the predicted probability and the label;

generating, by the online system, a relevance score for each item of the set based on an amount of information describing the item matched by the search query and the likelihood of the user including the respective item in an order;

ranking, by the online concierge-system, the items of the set based on the relevance scores;

determining, by the online system, a predicted availability of each item of the set using a machine learned availability model that is trained to predict a likelihood that an item is available, wherein the availability model is trained by:

receiving a plurality of attributes associated with a plurality of items, receiving, for each item of the plurality of items, a label indicating an availability of the item, applying the availability model to each of the plurality of items to determine a difference between the label and the predicted likelihood of the respective item, updating the label of the respective item based on the determined difference, and updating the availability model for each of the plurality of items using the updated labels;

determining, by the online system, a confidence score for each item of the set, wherein determining the confidence score comprises computing a weighted sum of at least the relevance score and the predicted availability of the respective item;

modifying, by the online system, the ranking of the items of the set by adjusting a position in the ranking of the item of the set based on the confidence score for the item of the set;

repositioning, by the online system, visual representations of the items within a graphical user interface according to their modified rankings, such that higher- ranked items are displayed at more prominent locations, wherein repositioning includes promoting or demoting, within the graphical user interface, a position of an item relative to other items based on the confidence score of the item relative to the other items; and transmitting the user interface from the online system to a client device of the user for display.

11. The system of claim 10, wherein the confidence score of the item of the set is further calculated using one or more selected from a group consisting of: a degree with which information describing the item of the set, a measure of specificity of the search query, and a probability of the item of the set being replaced by one or more replacement items.

12. The system of claim 10, wherein the confidence score for the item of the set comprises a weighted combination of the relevance score for the item of the set and the confidence score for each item of the set.

13. A computer program product comprising a non-transitory computer readable medium having instructions encoded thereon, that when executed by a processor, cause the processor to:

obtain, at an online system, an item database describing items at one or more locations;

receive, at the online system, an identification of the location from a user of the online system;

receive a search query to identify one or more items offered by the location at the online system;

select, by the online system, a set of items offered by the location from the item database for the location, each item of the set associated with information that is at least partially matched by the search query;

apply a machine-learned predictive model to data describing the user and each item of the set to output a likelihood of the user interacting with each item of the set, wherein the machine-learned predictive model is trained by:

accessing historical data comprising historical user interactions with items;

generating embeddings for users and items based on the historical data;

associating each user-item pair with a label indicating whether the user interacted with the item;

applying the machine-learned predictive model to each user-item pair to output a predicted probability that the user will interact with the item; and adjusting parameters of the machine-learned predictive model to reduce an error between the predicted probability and the label;

generate, by the online system, a relevance score for each item of the set based on an amount of information describing the item matched by the search query and the likelihood of the user including the respective item in an order;

rank, by the online system, the items of the set based on the relevance scores;

determine, by the online system, a predicted availability of each item of the set using a machine learned availability model that is trained to predict a likelihood that an item is available, wherein the availability model is trained by:

receiving a plurality of attributes associated with a plurality of items, receiving, for each item of the plurality of items, a label indicating an availability of the item, applying the availability model to each of the plurality of items to determine a difference between the label and the predicted likelihood of the respective item, updating the label of the respective item based on the determined difference, and updating the availability model for each of the plurality of items using the updated labels;

determine, by the online system, a confidence score for each item of the set, wherein determining the confidence score comprises computing a weighted sum of at least the relevance score and the predicted availability of the respective item;

modify, by the online system, the ranking of the items of the set by adjusting a position in the ranking of the item of the set based on the confidence score for the item of the set;

reposition, by the online system, visual representations of the items within a graphical user interface according to their modified rankings, such that higher-ranked items are displayed at more prominent locations, wherein repositioning includes promoting or demoting, within the graphical user interface, a position of an item relative to other items based on the confidence score of the item relative to the other items; and transmit the user interface from the online system to a client device of the user for display.

14. The computer program product of claim 13, wherein the confidence score of the item of the set is further calculated using one or more selected from a group consisting of: a degree with which information describing the item of the set, a measure of specificity of the search query, and a probability of the item of the set being replaced by one or more replacement items.

15. The computer program product of claim 13, wherein the instructions to modify, by the online system, the ranking of the items of the set by adjusting a position in the ranking of the item of the set based on the confidence score for the item of the set further cause the processor to:

retrieve ranges of confidence scores maintained by the online system;

determine a range of confidence scores including the confidence score of the item of the set; and responsive to the determined range of confidence scores indicating a moderate predicted availability of the item of the set, decrease the position in the ranking of the item of the set.

16. The computer program product of claim 15, wherein the instructions to decrease the position in the ranking of the item of the set further cause the processor to:

decrease the position in the ranking of the item of the set by a specific number of positions.

17. The computer program product of claim 15, wherein the instructions to decrease the position in the ranking of the item of the set further cause the processor to:

decrease the position in the ranking of the item of the set to an alternative position that is lower than a specific position in the ranking.

18. The computer program product of claim 15, wherein the instructions, when executed by the processor, further cause the processor to:

responsive to the determined range of confidence scores indicating a low predicted availability of the item of the set, decrease the position in the ranking of the item of the set, decrease a position of the item of the set in the ranking to a position that is below positions in the ranking of each item of the set having a confidence score in the range of confidence scores indicating the moderate predicted availability and storing an indication in association with the item of the set that the item of the set has a low predicted availability.

19. The computer program product of claim 18, wherein the instructions further cause the processor to:

display information describing the item of the set in the position that is below positions in the ranking of each item of the set having the confidence score in the range of confidence scores indicating the moderate predicted availability and displaying the indication the item of the set has the low predicted availability in conjunction with the information describing the item of the set in the position that is below positions in the ranking of each item of the set having the confidence score in the range of confidence scores indicating the moderate predicted availability.

20. The computer program product of claim 18, the instructions, when executed by the processor, further cause the processor to:

responsive to the determined range of confidence scores indicating a low predicted availability of the item of the set, remove the item of the set from the ranking.

21. The computer program product of claim 15, wherein the instructions to decrease the position in the ranking of the item of the set further cause the processor to:

determine that the position in the ranking of the item of the set equals or exceeds a threshold position; and in response to determining that the position in the ranking of the item of the set equals or exceeds a threshold position, maintain the position in the ranking of the item of the set.

* * * * *